United States Patent [19]
Schmidt, Jr.

[11] Patent Number: 4,989,917
[45] Date of Patent: Feb. 5, 1991

[54] ARTICULATED HOPPER DISPOSAL SYSTEM

[75] Inventor: Ronald L. Schmidt, Jr., Glencoe, Ill.

[73] Assignee: Peabody Myers Corporation, Streator, Ill.

[21] Appl. No.: 392,438

[22] Filed: Aug. 11, 1989

[51] Int. Cl.⁵ .............................................. B60P 1/34
[52] U.S. Cl. ..................................... 298/11; 414/917; 414/421; 414/546; 298/10
[58] Field of Search ..................... 298/11, 10; 414/419, 414/420, 421, 422, 590, 471, 917, 546

[56] References Cited

U.S. PATENT DOCUMENTS

| | | |
|---|---|---|
| 2,527,818 | 10/1950 | Ives .................... 414/917 X |
| 3,066,984 | 12/1962 | Hori ...................... 298/11 |
| 3,631,998 | 1/1972 | Fowell .................. 298/11 X |
| 4,019,780 | 4/1977 | Bishop .................... 298/11 |
| 4,084,715 | 4/1978 | Stedman ............. 414/917 X |
| 4,523,788 | 6/1985 | Prasad ................... 298/11 |
| 4,613,271 | 9/1986 | Naab .................. 414/421 X |

Primary Examiner—Frank E. Werner
Assistant Examiner—James T. Eller, Jr.
Attorney, Agent, or Firm—Roper & Quigg

[57] ABSTRACT

A method and apparatus for removing debris from a vehicular debris collection hopper and transferring it to a debris receptacle.

9 Claims, 2 Drawing Sheets

ARTICULATED HOPPER DISPOSAL SYSTEM

FIELD OF THE INVENTION

The present invention relates to street sweeping systems, and more particularly to methods and apparatus for transferring debris in a hopper on a sweeper vehicle to a stationary receptacle.

BACKGROUND OF THE INVENTION

Street cleaning vehicles generally include refuse collection systems which transfer sweepings into a vehicle mounted refuse hopper. The sweepings are typically transferred into the hopper via a large conduit which has at least a partial vacuum provided by a vehicle mounted suction pump. Many systems include a water spray applied to the street proximate the sweeper brushes during the street sweeping operation, so that water and damp debris are sucked through the conduit and deposited into the vehicle debris hopper. Other systems employ mechanical brushes which sweep debris onto a conveyor belt for transfer to the debris hopper.

The debris hoppers for such vehicles generally include some means for transferring their contents to a separate stationary receptacle after they fill with water and debris. The hoppers are generally emptied by tilting, or some combination of lifting and tilting, to dump their contents into the stationary receptacle. Such a tilting, or combined lifting and tilting, operation has resulted in excessive spillage of the hopper contents because a hopper so tilted, or both lifted and tilted, has insufficient lateral displacement to prevent some spillage of discharge from hopper to receptacle. This inevitable spillage causes costly cleanup procedures during the dumping operations.

The FMC Vanguard 3000 sweeper vehicle is a typical example of a simple tilting hopper discharge arrangement. The hopper rotates around a fixed offset pivot point to tilt its rearward side lip over a stationary refuse receptacle. The tilting action is controlled with extendable cylinders mounted between the hopper and the sweeper vehicle support platform, with each cylinder on an opposite side of the hopper transverse to the pivoted side of the hopper. A lip discharge baffle plate, rotatably mounted below the rearward discharge lip of the hopper, serves to reduce discharge spillage. The fixed offset pivot point about which the hopper rotates also serves to minimize spillage. However, the baffling and fixed offset pivot point still do not eliminate spillage to a satisfactory degree. Furthermore, the height of the fixed offset pivot point for the hopper must be in the range of the height of the refuse receptacle into which the hopper discharges so that the lip of the hopper can clear the lip of the receptacle. Consequently, the hopper must rest on the vehicle platform at a higher level than might otherwise be desirable, thereby adversely affecting vehicle stability.

The Elgin Pelican and the Athey Mobil II are examples of sweeper vehicles which rely on a combination of lifting and tilting the hopper for the hopper discharge operation. Each side of the hopper is rotatably connected to the vehicle platform with a support bar. The support bars swing the hopper upward to bring the hopper to the desired height for discharge into a debris receptacle. The tilting operation of the hopper to discharge its contents is secured by adding two serially connected bars between the hopper and each of the support bars. The combination forms a four-bar linkage on each side of the hopper, with the hopper serving as a first bar, the support bar as a second, and the serially connected bars as third and fourth bars, respectively. One of the serially connected bars on each side of the hopper is connected to a cylinder which rotates the linkage to which it connects as the cylinder is extended, thereby forcing the hopper to rotate about the support bars to which it connects, allowing the hopper to discharge into the receptacle.

Although this system allows for operation of the sweeper vehicle with its hopper close to street level for maximum stability, even when the debris receptacle into which it must dump its contents has a significant height, the hopper must be lifted into position for discharge as described above. Furthermore, because of the necessity for swinging the hopper up to the desired height for discharge, the vehicle must move the hopper over the debris receptacle only after the hopper is swung up to the desired height. This is because of the necessity for providing sufficient clearance for the hopper from the debris receptacle to permit the hopper to swing. The necessary clearance so provided then prevents the hopper from discharging into the receptacle when so positioned. Moving the vehicle when the hopper is lifted to better position it over the receptacle is an undesirable step because inefficiencies of use and possible instabilities created by the height of the hopper when raised. Outrigger supports are not usable in this instance to improve stability because of the necessity for moving the vehicle to best position the hopper.

The RAVO Models 200 and 250 are sweeper vehicles which raise the whole hopper while tipping its rearward side toward a debris receptacle for discharge. This is accomplished with a crossed four-bar linkage lift arrangement along each of opposite sides of the hopper, with the hopper and vehicle platform each serving as respective first and second bars, a rigid support bar between the platform and hopper as a third bar, and an extendable cylinder, between the platform and hopper, and mounted crosswise to the rigid support bar, serving as the fourth bar. The crosswise configuration of the linkage system causes the hopper to tilt toward a debris receptacle as the hopper is raised by extending the cylinders. However, the tilting action so provided is insufficient to permit dumping the hopper contents from the lip of the hopper. Instead, a trap door on the rear of the hopper adjacent the debris receptacle is released after the hopper is tipped to provide a discharge path for the hopper. The trap door discharge system is prone to sealing and spillage problems.

The RAVO Model 4000 Container Dump style sweeper vehicle simultaneously lifts and rearwardly displaces its hopper to position the hopper discharge door over a high-walled debris receptacle. The hopper is lifted by two substantially parallel cylinders along each side of the hopper between the hopper and the vehicle platform. The hopper is guided rearward towards the debris receptacle by two four-bar linkages arranged on each side of the hopper between the bottom of the hopper and the vehicle platform. The hopper and the vehicle platform serve as respective first and second bars, and the two rigid support bars connecting them on each side as the third and fourth bars. As the cylinders lift the hopper from the vehicle, the twin four-bar linkages force the hopper rearward to position its anterior discharge door over the debris receptacle.

This model does not have positive tilting action to insure complete discharge of the hopper contents into the debris receptacle.

OBJECTS OF THE INVENTION

Accordingly, a primary object of the present invention is to provide a hopper discharge system for a street sweeping vehicle which substantially eliminates spillage during the dumping operation.

Another object of the invention is to provide a hopper discharge system which maintains sweeper vehicle stability during its operation.

Yet another object of the invention is to provide a hopper discharge system which may be operated without shifting the sweeper vehicle location.

Still another object of the invention is to provide a hopper discharge system without trap doors on the side of the hopper.

A further object of the invention is to provide a hopper discharge system which is suitable with even large capacity hoppers.

SUMMARY OF THE INVENTION

The above-described objects, as well as other objects and advantages of the present invention which are indicated below and recited in the appended claims, are secured with a hopper discharge system for a street sweeper vehicle which first lifts the hopper into a desired dumping position over a refuse receptacle, and then tilts the hopper to permit the hopper contents to discharge over the lip of the rearward side of the hopper. The lifting action is accomplished with cylinder driven four-bar linkages mounted along each side of the hopper, which serve to both lift the hopper and laterally shift it into position over the refuse receptacle, while maintaining sufficient clearance from the receptacle during the lifting process. The tilting process is accomplished with additional cylinders, which rotate the lifted hopper to provide a discharge path over the lip of the rearward side of the hopper.

Since the hopper is lifted over the debris receptacle, its normal resting position may be situated for vehicle stability. Furthermore, since the hopper shifts laterally as it is lifted into position, the vehicle need not be moved into position after the hopper is lifted. Because the hopper can be rotated for dumping independently of the lifting process, no hopper side trap doors are required for dumping or off-loading purposes. The separate tilting operation after lifting is also more adaptable to large capacity hoppers.

DETAILED DESCRIPTION OF THE INVENTION

Figure 1:
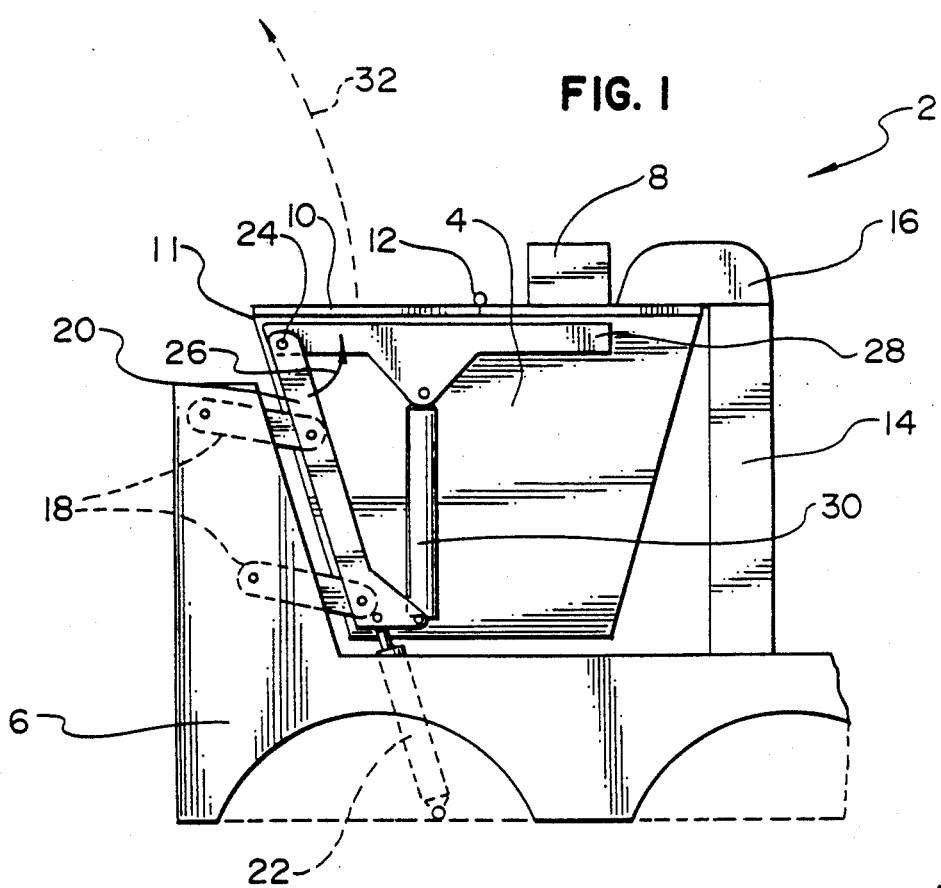
FIG. 1 is a street cleaning vehicle with a hopper disposal system according to the present invention shown in the rest position.

Referring to the drawings, wherein like reference characters designate like or corresponding parts throughout the views, FIG. 1 shows a representational street sweeping vehicle 2 with a hopper discharge system according to the present invention. A hopper 4 rests on a vehicle bed support frame 6 along the rear of the vehicle 2. An exhaust fan system 8 pulls air out of the hopper 4, since a trap door 10 hinged along the top of the hopper 4 with a linear hinge 12 serves to prevent air from entering the top of the hopper 4. Instead, air flow is established from street level via an intake tube 14 and the hopper intake baffle 16. Thus, the suction of air from the intake tube 14, through the hopper intake baffle 16, into the hopper 4, and out of the exhaust fan 8 serves to suck street sweepings proximate the inlet of the intake tube 14 near street level into the hopper 4. The sweepings fall into the hopper 4 rather than pass through the fan 8 because of the lower velocity of the air flow after exiting the hopper intake baffle 16. The hopper 4 is movably mounted on the support frame 6 with at least one four-bar linkage arrangement, but preferably one four-bar linkage on each side of the hopper 4 for optimum alignment and stability. The four-bar linkage arrangement comprises two hinge bars 18 pivotably coupled to a substantially vertical portion of the support frame 6, and the other end of each of the hinge bars 18 pivotably coupled to the hopper 4 via a hopper support bar 20. The four-bar linkage system is operated to displace elevationally the hopper 4 relative to its rest position on the vehicle bed support frame 6, as shown in FIG. 1, with a mechanical operator 22 coupled between the support frame 6 and the support bar 20. The mechanical lift operator 22 may be of any convenient type, and may either be manually operated or power assisted. The lift operator 22 is shown as a fluidically powered cylinder in FIG. 1.

The hopper 4 is rotatably mounted to the support bar 20 to permit the hopper 4 to rotate about a pivot point 24 as represented by an arrow 26. Although the support bar 20 may be pivotably coupled directly to the hopper 4, in FIG. 1 the coupling between the support bar 20 and the hopper 4 secured by pivotably coupling the support bar 20 to a hopper rotation bar 28. The hopper rotation bar 28 is rigidly fastened to the side of the hopper 4 and enhances mechanical stability for the hopper rotation process. A mechanical hopper rotation operator 30 is pivotably connected between the support bar 20 and the rotation bar 28. The rotation operator 30 may be of any convenient type, and may be either manually operated or power assisted. The rotation operator 30 is shown as a fluidically powered cylinder in FIG. 1.

In operation, the hopper 4 is elevationally displaced from the support frame 6 with the assistance of the lift operator 22. The lift operator 22 raises the support bar 20, and the support bar 20 in turn lifts the hopper 4. Of course, as described above, it is desirable that a four-bar linkage system be provided on each of opposite sides of the hopper 4 so that, although not shown in FIG. 1, two of the lift operators 22 may be used, one on each opposite side of the hopper 4, each of the lift operators 22 connected between the support platform 6 and a different one of the support bars 22 on opposite sides of the hopper 4. The use of four-bar linkages on each opposite side of the hopper 4 substantially improves stability of the hopper 4 as it is lifted by the lift operator 22. The direction of lift for the hopper 4 provided by the lift operators 22 is constrained by the hinge bars 18 of the four-bar linkage systems on each opposite side of the hopper 4 so that the hopper 4 generally follows the curvilinear path represented by the dashed arrow 32.

Figure 2:
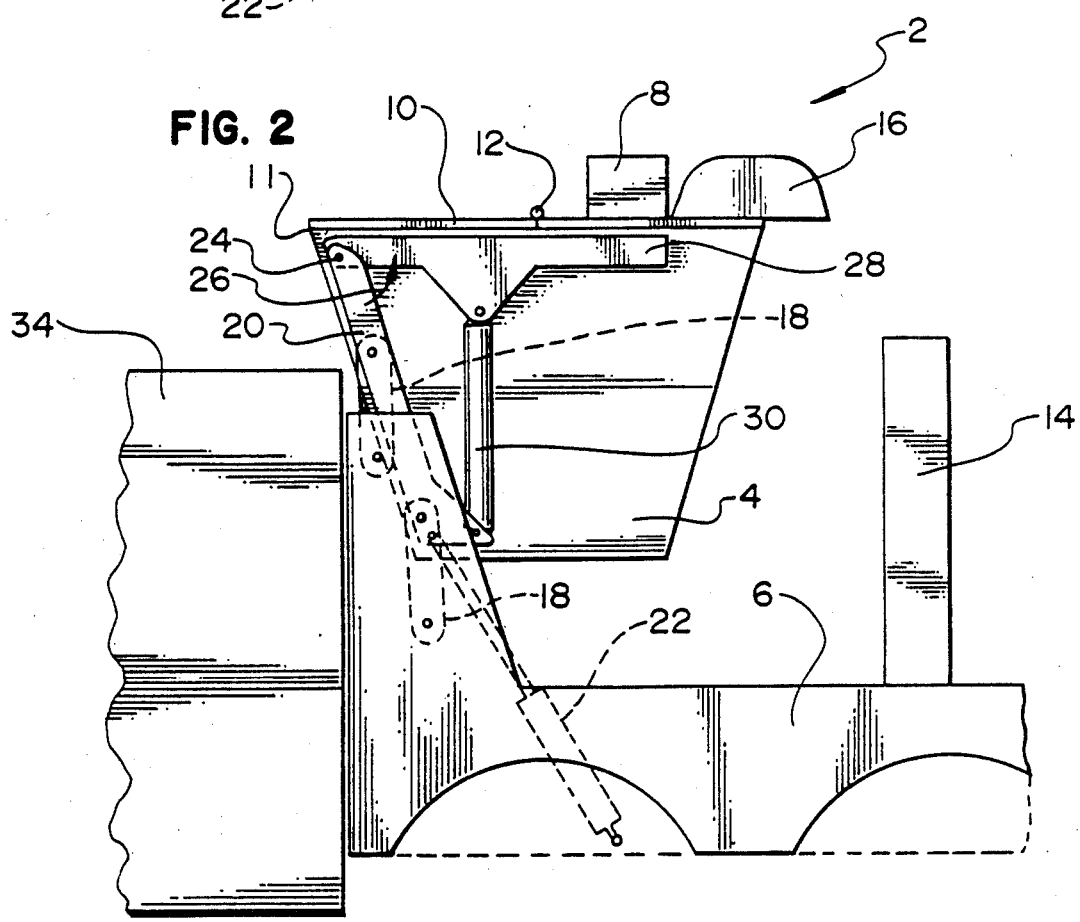
FIG. 2 is the street cleaning vehicle of FIG. 1 with its hopper disposal system shown in the fully extended position.

When the lift operators 22 are fully extended, the hopper 4 assumes an elevated, laterally displaced position as shown in FIG. 2. In this position the elevation of the lip 11 of the hopper 4 along the trap door 10 is more than sufficient to completely clear the lip 11 of a debris receptacle 34 placed adjacent to the rear of the vehicle 2. It is also clear that the lip of the hopper 4 overlaps the lip of the debris receptacle 34. Furthermore, it is also apparent that the hopper 4 may be so lifted into position even after the debris receptacle 34 is placed against the vehicle, with no resulting clearance problems during the hopper elevation process.

Figure 3:
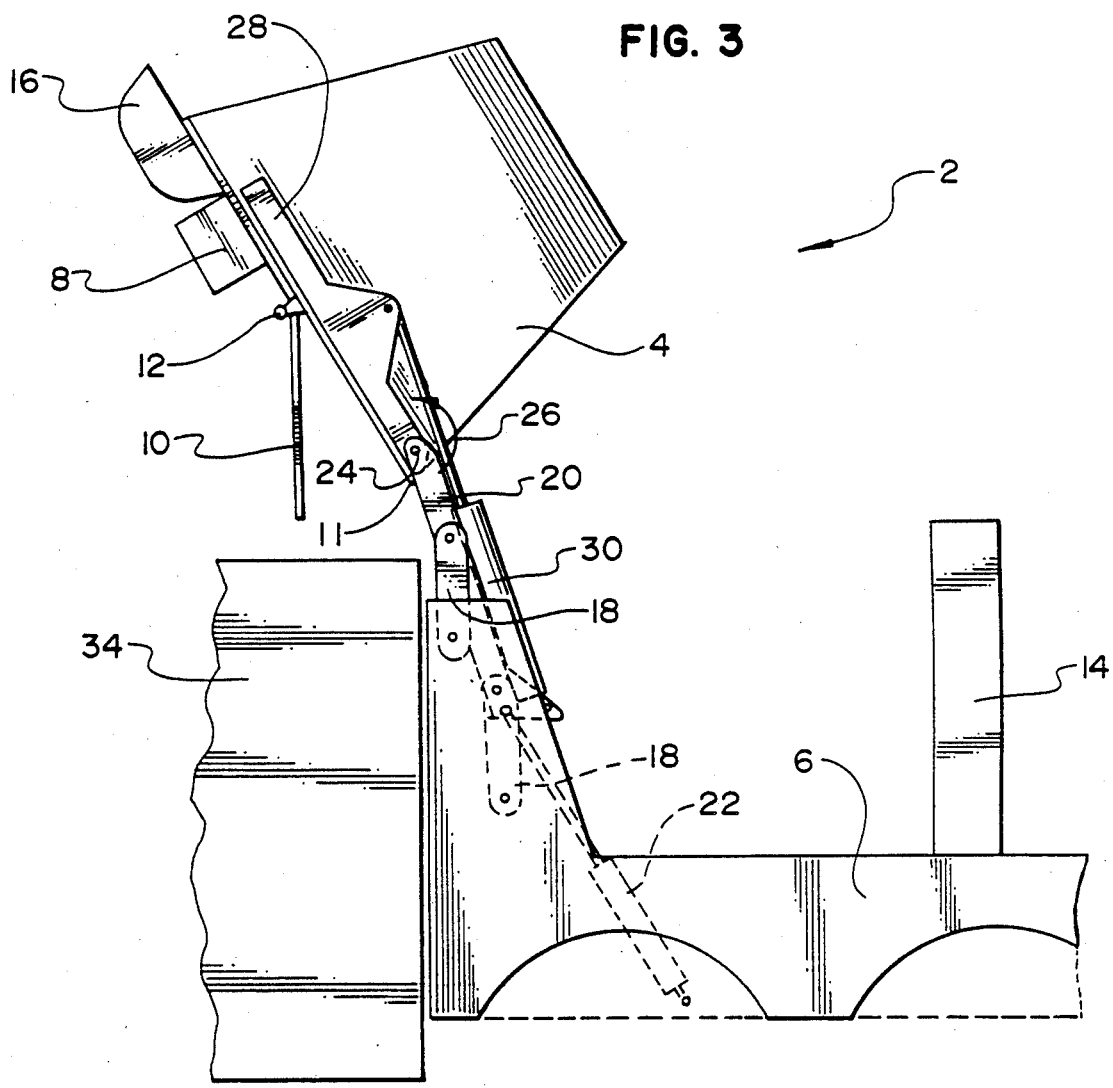
FIG. 3 is the street cleaning vehicle of FIG. 1 with its hopper disposal system shown in the fully extended and rotated position.

After the hopper 4 is fully raised and laterally displaced as shown in FIG. 2, the hopper is rotated to dump its contents into the debris receptacle as shown in FIG. 3 by fully extending the rotation operator 30 connected between the rotation bar 28 and the support bar 20. Once again, as described above, it is desirable that a four-bar linkage system be provided on each of opposite sides of the hopper 4 so that, although not shown in FIG. 2, two of the rotation operators 30 may be used, one on each opposite side of the hopper 4, each one of the rotation operators 30 connected between different ones of the rotation bars 28 and the support bars 20 on opposite sides of the hopper 4. Having the rotation operators 30 on both of the opposite sides of the hopper 4 improves alignment and mechanical stability for the hopper 4. The hopper 4 is thereby rotated about the pivot point 24 in the direction of the arrow 26 to tilt the hopper 4 over the debris receptacle 34. The pivot point 24 is advantageously offset above the coupling points of the hinge bars 18 on each of the support bars 20 to provide additional lateral and elevational displacement of the lip 11 of the hopper 4 relative to the lip of the debris receptacle 34. The angle of rotation is sufficient to both swing open the trap door 10 from along the hinge 12 and to permit the entire contents of the hopper 4 to fall into the debris receptacle 34.

The combination of the curvilinear elevation path of the hopper 4 coupled with the large degree of rotation possible in its fully elevated position permit the hopper 4 to be completely emptied into the debris receptacle 34 without spillage. This is true even when the debris receptacle 34 has a peripheral lip which is much higher than the peripheral lip of the hopper 4 when the hopper 4 is in its rest position on the support frame 6. Spillage is eliminated, or dramatically reduced, because the lip of the hopper 4 overlaps the corresponding lip of the debris receptacle 34. Because the entire procedure may be carried out while the vehicle 2 is stationary, the vehicle 2 may be stabilized with outrigger supports, as desired. The hopper 4 may be of any desired size, within the limits of the ruggedness and handling capacity of the associated components. Because of the considerable angle of rotation possible for the hopper 4 with the above described configuration, no side trap door is required for complete emptying of the hopper 4 into the debris receptacle 34.

Depending upon design choice, the exact configuration and arrangement of the preferred embodiment of the present invention described above may be made to suit specific requirements. For instance, the hinge bars 18 on the four-bar linkage arrangements may be made of unequal length and they need not be mounted substantially parallel to each other as shown in the Figures. Likewise, the lift operators 22 and the rotation operators 30 may be of different types, for instance, rotary positioners, and mounted at different points, to produce the same respective lifting and rotating operations on the hopper 4.

It will be understood that various changes in the details, arrangements and configurations of the parts and assemblies which have been described and illustrated above in order to explain the nature of the invention may be made by those skilled in the art within the principle and scope of the present invention as expressed in the appended claims.

What is claimed:

1. Apparatus for transferring the contents of a hopper having a hopper lip around its perimeter into a receptacle that has a receptacle lip around its perimeter, which receptacle lip is elevated and laterally displaced with respect to said hopper lip, comprising:

a support frame having a substantially vertical portion;

at least one linkage comprising a substantially vertically extending bar coupled to said vertical portion of said support frame and two hinge bars, each of said hinge bars pivotally mounted between said vertically extending bar and said vertical portion of said support frame to provide elevational freedom of movement and coupled to a side of said hopper at an upper distal end of said vertically extending bar with rotational freedom of movement;

at least one first operator mounted between said support frame and said vertically extending bar of said linkage to elevate said hopper from said support frame along the travel of said vertically extending bar of said linkage relative to said support frame; and at least one second operator mounted between said hopper and said vertically extending bar to rotate said hopper around the rotational axis of said distal end coupling to said vertically extending bar of said linkage.

2. The apparatus recited in claim 1, wherein said first and second operators are fluidic cylinders.

3. The apparatus recited in claim 1, wherein said linkage comprises a four-bar linkage formed by said vertically extending bar, said hinge bars and said vertical portion of said support frame.

4. The apparatus recited in claim 1, wherein said support frame is a vehicle body.

5. Apparatus for transferring the contents of a hopper having a hopper lip around its perimeter into a receptacle that has a receptacle lip around its perimeter, which receptacle lip is elevated and laterally displaced with respect to said hopper lip, comprising:

a support frame having a substantially vertical portion;

two linkages, each of said linkages comprising a substantially vertically extending bar coupled to said vertical portion of said support frame and two hinge bars, each of said hinge bars pivotally mounted between each of said vertically extending bars and said vertical portion of said support frame to provide elevational freedom of movement and each of said linkages coupled to opposite sides of said hopper at an upper distal end of each of their respective ones of said vertically extending bars with rotational freedom of movement;

two first operators, each of said first operators mounted between said support frame and each of said vertically extending bars of said linkages to elevate said hopper from said support frame along the travel of said linkages relative to said support frame; and two second operators, each of said second operators mounted between said hopper and each of said vertically extending bars of said linkages to rotate said hopper about the rotational axis of said distal end coupling for each of said vertically extending bars of said linkages.

6. The apparatus recited in claim 5, wherein each of said first and second operators are fluidic cylinders.

7. The apparatus recited in claim 5, wherein each of said linkages comprises a four bar linkage formed by a respective one of said vertically extending bars, their associated ones of said hinge bars and said vertical portion of said support frame.

8. The apparatus recited in claim 5, wherein said support frame is a vehicle body.

9. Apparatus for transferring the contents of a vehicularly mounted hopper having a hopper lip around its perimeter into a receptacle that has a receptacle lip around its perimeter, which receptacle lip is elevated and laterally displaced with respect to said hopper lip, comprising:

a vehicle body support frame having a substantially vertical portion;

two four-bar linkages, each of said four-bar linkages comprising a vertically extending bar and two hinge bars, each of said hinge bars pivotally mounted between each of said vertically extending bars and said support frame, with each of said linkages rotationally coupled to opposites sides of said hopper at an upper distal end of each respective one of said vertically extending bars of said linkages;

two first fluidic cylinder operators, each of said first operators mounted between said support frame and said vertically extending bar of each of said four-bar linkages to displace said hopper from said support frame along the travel of said four-bar linkages; and two second fluidic cylinder operators, each of said second linear operators mounted between said hopper and said vertically extending bar of each of said four-bar linkage to rotate said hopper relative to said support frame about said pivotal coupling to each of said vertically extending bars.

* * * * *